Dec. 2, 1958    A. L. VANDERGRIFF ET AL    2,862,247
SEED COTTON CLEANER

Filed May 13, 1955    2 Sheets-Sheet 1

INVENTOR.
ARVEL L. VANDERGRIFF
& WILLIAM C. PEASE III
BY Jennings & Carter
ATTORNEYS

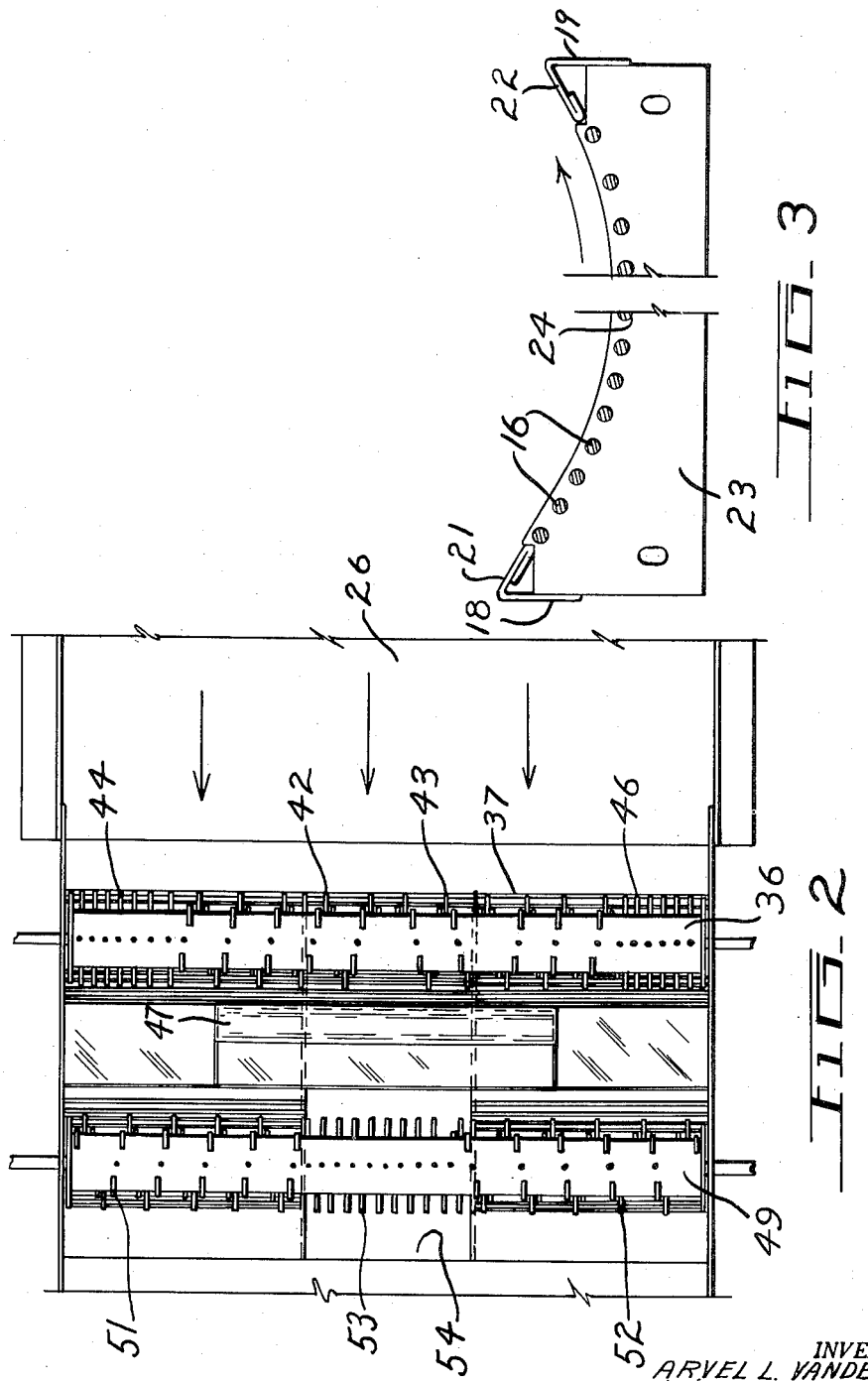

2,862,247
SEED COTTON CLEANER

Arvel L. Vandergriff and William C. Pease III, Columbus, Ga., assignors to Lummus Cotton Gin Company, a corporation of Georgia Application May 13, 1955, Serial No. 508,214

4 Claims. (Cl. 19—93)

This invention relates to seed cotton cleaners and has for its object the provision of apparatus which shall be especially adapted for cleaning rough harvested cotton as it comes from the field.

A feature of our invention is the provision of a series of spiked rollers with cooperative screens formed of axially extending spaced bars over which the cotton is moved by the rollers with a rubbing action whereby sticks, leaves and other large trash is caused to pass between the bars.

Another feature of our invention is the provision of a multiple screening unit adapted to separate sticks, burrs, and other trash with some cotton from the main stream of seed cotton, together with a reclaiming unit to which the trash and accompanying cotton is sent for further trash removal and from which the cotton is returned to the main cotton stream.

A more specific object of our invention is the provision, in a seed cotton cleaning unit, of an improved screen comprised of spaced elongated bars over which the cotton is caused to travel for the separation of trash therefrom and in which the bars are spaced closer together for the initial portion of the cotton travel than during the later portion of the travel.

A still further object of our invention is to provide seed cotton cleaning apparatus including means to feed cotton as it comes from the stalk into an upwardly inclined cleaner, and subject it to a multiplicity of cleaning operations in each of which the cotton is conveyed upwardly while being rubber over grid bars extending transversely of the direction of movement of cotton thereover to separate trash therefrom as it is moved from the lower portion of the apparatus to the upper end thereof where it is discharged.

Another object of our invention is to provide a seed cotton cleaner which shall include an upwardly inclined series of horizontally disposed spiked reclaiming cylinders with a grid bar screen comprised of axially disposed bars under each cylinder and in which the cylinders are rotated in a direction to move cotton sucessively over said screens with a scrubbing action from the lowest cylinder in the series to the uppermost.

Briefly our invention comprises a cleaner embodying an upwardly inclined casing in which is mounted an upwardly inclined series of horizontally disposed spiked rollers. A screen comprised of axially extending spaced grid bars is mounted under each spiked roller providing axially extending elongated passages therebetween. A stream of cotton is fed into the casing over the rollers and is carried thereby to the lower end of the casing, and is then moved upwardly by the rollers in contact with the screens to the upper end of the casing and discharged. During its upward movement sticks, stems, burrs and other trash together with some cotton are caused to pass through the screens and slide down the bottom of the casing to the lower end of the casing. In the lower end of the casing we provide a reclaiming unit for treatment of the trash passing through the screen. The reclaiming unit comprises a saw cylinder, a spiked picker roller disposed to receive the trash and throw it up against the saw cylinder, a stripper roller for knocking burrs and trash clinging to the cotton back to be retreated, and means to doff cotton from the saw cylinder and return it to the main stream of cotton being treated.

Apparatus embodying features of our invention is illustrated in the accompanying drawings forming a part of this application in which:

Fig. 2 is a detail sectional plan view taken along the line II—II of Fig. 1, drawn to a larger scale; and, Fig. 3 is a detail sectional view of one of the cleaner screens.

Figure 1:
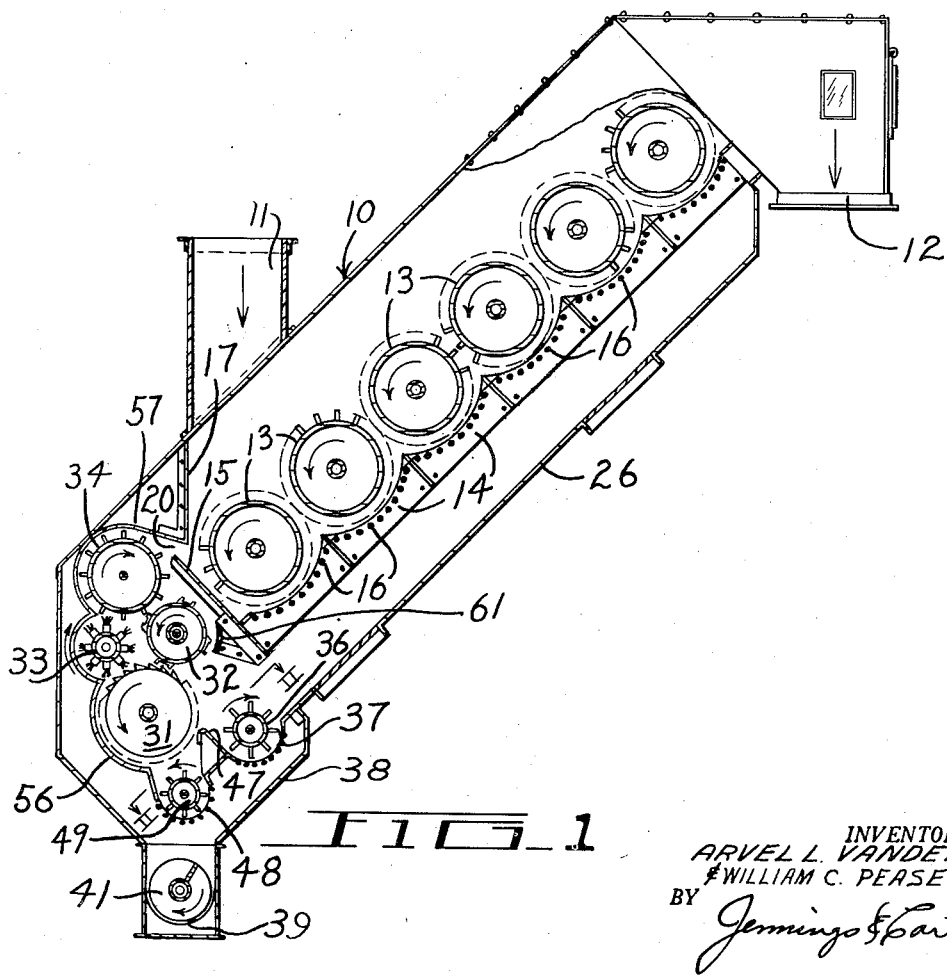
Fig. 1 is a longitudinal sectional view through the apparatus.

Referring now to the drawings for a better understanding of our invention, we show apparatus embodying an upwardly inclined elongated casing 10 having a cotton inlet 11 near its lower end and a cotton discharge outlet at 12. Mounted in the casing 10 are a plurality of spiked rollers 13 all of which rotate over screens 14 in the direction indicated by the arrows, one such screen being mounted under each of the rollers. In the drawing we have indicated six such rollers but it will be apparent that any suitable number may be employed. The screens 14 are each comprised of elongated, spaced grid bars 16 which extend entirely across the casing, thus defining elongated openings therebetween through which sticks, stems and other large trash may pass. Adjacent the lowest spiked roller 13 is a baffle member 17 which extends downwardly from the top of the casing 10 and across the casing to deflect cotton downwardly from the roller. Extending across the casing adjacent the lowest roller 13 is a partition 15 the upper end of which is spaced from the lower end of the baffle 17 to define a passage 20 therebetween. It will thus be seen that cotton admitted into the casing through the inlet 11 will be tossed downwardly to the lower end of the casing, thereby loosening it and separating loose dirt and trash which passes down through the screens 14. When the cotton reaches the lowest roller 13 it is deflected by the baffle member 17 and partition 15 and is thus carried around under the lowest roller and over its associated screen 14. It is thence conveyed upwardly over the succeeding screens 14 to the cotton outlet 12. In its travel over the screens it is rubbed over the grid bars 16 forming the screens thus causing trash, sticks and stems to pass between the grid bars.

Referring to Fig. 3, we show a particular feature of the screens 14. Separating each of the screens 14 from its next associated screen are vertical members 18 and 19 having inwardly directed turned over lips 21, 22 at the top. The rods are mounted in side plates 23 having holes 24 therein for receiving the ends of the rods. Considering the direction of travel of the cotton over the screen as that shown by the arrow, the distance between the first rod 16 and the adjacent edge of the lip 21 is less than the spacing between adjacent rods. For example, we may space the first rod a distance of ¼ of an inch from the adjacent lip, and provide a space of ⅜ of an inch between the rods in the first half of the screen. A space of ⅝ of an inch may be provided between the rods in the last half of the screen in relation to the direction of travel of cotton thereover. We have found such spacing provides for the maximum discharge of trash with a minimum discharge of cotton although it will be apparent that the spacing may be varied somewhat. In other words, with rods of equal spacing, we have found the maximum discharge of cotton, together with trash, through the screens occurs during the travel of the cotton over the first half of the screen and the minimum discharge through the second half. By spacing the rods forming the first half of a screen closer together than in the last half, we minimize the passage of cotton through the screens.

The trash, with accompanying cotton, passing through the screens falls onto the smooth bottom 26 of the casing 10 which forms a slide down which the trash moves to the lower end of the casing. Mounted in the lower end of the casing is a reclaiming unit embodying a saw cylinder 31, a stripper roller 32, doffing brush 33, and a spiked feed roller 34 which receives cotton from the doffing brush 33 and returns it through the passage 20 to the main stream of cotton passing under the lowest spiked roller 13.

At the lower end of the slide 26 is provided a spiked feed roller 36 which rotates over a screen 37 similar to those already described except that the rods forming the screen may be evenly spaced to provide for a minimum discharge of cotton therethrough. Trash passing through the screen 37 slides down the lower bottom portion 38 into a conveyer trough 39 having a conveyer 41 therein which discharges the trash from the apparatus.

Referring to Fig. 2 it will be seen that the spikes on the spiked roller 36, intermediate the ends thereof, are arranged in oppositely inclined spiral rows 42 and 43 so that trash passing down the slide 26 to the roller 36, intermediate the ends of the roller, is conveyed to the ends as it is being passed over the screen 37 and is discharged from the ends by radial rows of spikes 44 and 46. Mounted intermediate the ends of the roller 36, on the outlet side thereof and terminating short of points opposite the radial rows of spikes 44 and 46 is a baffle, or kick board 47 which causes trash and cotton to be discharged from the roller 36 principally by the radial rows of spikes 44 and 46.

Trash discharged by the roller 36 passes into a screened trough 48, the screen of which is formed by spaced elongated bars as already described, similar to the bars of screen 37 except that the screen 48 is substantially semi-cylindrical. Mounted in the trough formed by the screen 48 is a spiked picker roller 49 the spikes of which, at the ends, are arranged in oppositely inclined rows 51 and 52 which causes the trash in the screen 48 to be conveyed from the ends toward the middle of the roller. In the middle portion of the roller there are provided radial rows of spikes 53 which are located over an opening 54 in the screen 48 leading into the trash conveyor trough 39.

The picker roller 49 tosses the trash with any cotton clinging thereto up against the saw cylinder 31 repeatedly so that the cotton clinging to the trash is engaged by the saw teeth and carried upwardly. Any trash clinging to the cotton carried upwardly by the saw 31 is knocked back by the stripper roller 32. The doffing brush 33 removes cotton from the saw 31 and, rotating in the direction indicated by the arrow, carries it upwardly so that is is taken off the doffing brush by the spiked feed roller 34 and delivered to the lowest spiked roller 13, as already described. On the rear, or lower side of the saw cylinder 31, the doffing brush 33, and the roller 34 is a continuous shield member 56 which extends from the upper wall of the casing 10 downwardly to the picker roller 49 being curved about the feed roller 34, the doffing brush 33, and saw cylinder 31 to prevent cotton from being thrown off therefrom. Mounted on the upper, or down going side of the feed roller 34 is a baffle member 57 which extends across the casing and is joined to the lower edge of the baffle member 17 whereby to direct cotton from the feed roller 34 downwardly through the passage 20 into the main stream of cotton passing under the lowest cleaner roller 13. The partition member 15 extends entirely across the casing adjacent the lowest roller 13 and thus prevents cotton from being thrown off from the lowest roller 13 into the reclaiming unit just described. Also mounted adjacent the stripper roller 32 is a baffle member 61 which acts to direct any burrs, sticks and heavy trash thrown off by the stripper roller 32, downwardly into the trough of the picker roller 36 for further treatment.

From the foregoing description, the operation of our improved apparatus will be readily understood. Cotton fed into the casing 10 through the inlet 11 is tossed by the cleaning rollers 13 downwardly to the lower end of the casing thus loosening the cotton and discharging sand, and other loose trash through the screens 14. The main stream of cotton is carried around by the lowest cleaner roller 13, as just described, and is drawn over the grid bars 16 of the screen with a rubbing action thus causing burrs, sticks, leaf trash and other objects to pass through the elongated openings formed between the bars 16. The cotton is passed upwardly under the cleaning rollers 13, in a manner well understood, to the upper end of the casing and is discharged through the cotton discharge outlet. Trash, with cotton clinging thereto, passing through the screens 14, slides down the smooth bottom 26 of the casing 10 to the lower end where it is passed over the screen 37 by the roller 36, which conveys the trash to the opposite ends thereof and discharges it past the ends of the kick board 47 into the trough formed by the screen 48. The picker roller 49, with its oppositely inclined rows of spikes, tosses the trash up against the saw 31 repeatedly, while conveying it toward the central discharge. Cotton in the trash is engaged by the saw 31 and is carried upwardly to be doffed by the doffing brush 33 mounted over the saw 31, and thence to the feed roller 34 and back to the main cotton stream as already described.

We have found with our improved cleaning apparatus that the burrs, sticks and stems, much leaf trash, and other objects in rough harvested cotton are readily removed by means of our improved apparatus, thus readying the cotton for handling by the usual equipment associated with cotton gins.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claims.

What we claim is:

1. In a seed cotton cleaner, a series of horizontally disposed spiked rollers, a screen under each roller comprised of axially extending grid bars defining elongated passages therebetween, means to feed a stream of cotton to be cleaned onto a roller at one end of the series, and means to rotate all the rollers in a direction to pull the cotton being cleaned from the end roller across the several screens and discharge it from the ultimate screen at the other end of the series, the grid bars in each screen being spaced closer together for the initial part of the movement of cotton thereover than for the latter part of said movement.

2. In a seed cotton cleaner, an upwardly inclined series of rotary spiked rollers, a screen comprised of axially extending spaced bars under each roller the bars on one side of each screen being spaced wider apart than on the other, means to feed a main stream of cotton onto the rollers to be carried thereby to the lower end of the series on top of the rollers and thence under the rollers and first over the more closely spaced bars and then over the more widely spaced bars in each screen to be delivered out of the upper end of the cleaner, a downwardly inclined slide under the screens to receive trash and cotton passing therethrough, a saw cylinder, means to feed the trash and cotton from the slide to the saw cylinder, a stripper roller mounted alongside the saw cylinder to knock back trash clinging to the cotton, means to doff cotton from the saw cylinder and feed it back into the main stream, and means to discharge the trash thus separated from the cotton.

3. In a seed cotton cleaner, a rotating spiked cylinder, a screen cooperating with the cylinder comprised of axially extending spaced rods, and means to deliver cotton to the cylinder to be drawn across the rods with a rubbing action, the rods in the half of the screen receiving the cotton being spaced closer together than in the half from which the cotton is delivered.

4. A cotton cleaning assembly comprising a plurality of concaves, each having a drum rotatable therein to propel cotton along the length of said assembly and against said concaves, said concaves each consisting of a plurality of rods disposed transversely to the path of cotton along said assembly and arranged in two groups, the spaces between the rods of the group adjacent the lead-in edges of the concaves being narrower than the spaces between the rods of the other group.

References Cited in the file of this patent

UNITED STATES PATENTS

| | | |
|---|---|---|
| 1,480,792 | Streun | Jan. 15, 1924 |
| 1,680,978 | Gerner | Aug. 14, 1928 |
| 1,976,382 | Blewett | Oct. 9, 1934 |
| 2,009,047 | Grimes | July 23, 1935 |
| 2,079,017 | Court | May 4, 1937 |
| 2,205,017 | McLean | June 18, 1940 |
| 2,421,483 | Deems et al. | June 3, 1947 |
| 2,639,469 | Roan | May 26, 1953 |